United States Patent
Huang et al.

(10) Patent No.: US 12,234,898 B1
(45) Date of Patent: Feb. 25, 2025

(54) COMPOSITE REDUCTION DRIVING MECHANISM

(71) Applicant: AEON MOTOR CO., LTD., Tainan (TW)

(72) Inventors: Hui-Hui Huang, Tainan (TW); Ching-Hsiung Tung, Tainan (TW); Yung-Chih Huang, Tainan (TW)

(73) Assignee: AEON MOTOR CO., LTD., Tainan (TW)

( * ) Notice: Subject to any disclaimer, the term of this patent is extended or adjusted under 35 U.S.C. 154(b) by 0 days.

(21) Appl. No.: 18/455,997

(22) Filed: Aug. 25, 2023

(51) Int. Cl.
| | |
|---|---|
| F16H 37/04 | (2006.01) |
| B60K 1/00 | (2006.01) |
| B62M 6/70 | (2010.01) |
| F16H 37/06 | (2006.01) |
| F16H 37/08 | (2006.01) |
| F16H 57/035 | (2012.01) |

(52) U.S. Cl.
CPC ............. F16H 37/04 (2013.01); B60K 1/00 (2013.01); F16H 37/041 (2013.01); F16H 57/035 (2013.01)

(58) Field of Classification Search
CPC ........ F16H 37/04; F16H 37/06; F16H 37/084; B62M 6/70
See application file for complete search history.

(56) References Cited

U.S. PATENT DOCUMENTS

| | | | | |
|---|---|---|---|---|
| 5,501,292 A | * | 3/1996 | Kawashima | B62J 43/20 180/220 |
| 5,749,429 A | * | 5/1998 | Yamauchi | B60L 15/2054 180/65.285 |
| 6,080,073 A | * | 6/2000 | Liu | B62M 6/55 180/206.3 |
| 8,777,791 B1 | * | 7/2014 | Hino | B60W 20/40 475/5 |
| 10,137,961 B2 | * | 11/2018 | Yamamoto | F16H 3/54 |
| 11,242,102 B2 | * | 2/2022 | Weigel | B60L 50/20 |
| 2016/0107721 A1 | * | 4/2016 | Urabe | B62M 6/55 475/4 |
| 2016/0167733 A1 | * | 6/2016 | Kawakami | B62M 6/70 180/220 |
| 2016/0280321 A1 | * | 9/2016 | Yamamoto | F16H 3/083 |
| 2016/0288872 A1 | * | 10/2016 | Shahana | B62K 25/286 |

* cited by examiner

*Primary Examiner* — Ha Dinh Ho
(74) *Attorney, Agent, or Firm* — Rosenberg, Klein & Lee

(57) ABSTRACT

A composite reduction driving mechanism is configured to be applied to an electrical power system of an electric vehicle and to connect between an electric motor of the electrical power system and a wheel shaft. The composite reduction driving mechanism comprises a reduction gear set and a transmission band set. The reduction gear set connects a driving shaft of the electric motor. The transmission band set connects between a driven shaft of the reduction gear set and a wheel shaft. Power outputted by the electric motor is transmitted to the wheel shaft through the composite reduction driving mechanism and through two times of speed reduction during transmission, thus providing a high-torque power performance to the wheel shaft.

7 Claims, 7 Drawing Sheets

COMPOSITE REDUCTION DRIVING MECHANISM

BACKGROUND OF THE INVENTION

1. Field of the Invention

The present invention relates to a power system of an electric vehicle, especially to a composite reduction driving mechanism, which is mounted in the power system of the electric vehicle, is connected between an electric motor and a wheel shaft, and has a high-torque-transmission power performance.

2. Description of Related Art

An electrical power system of an electric vehicle nowadays mainly uses an electric motor combining a transmission mechanism or a reduction mechanism to connect a wheel shaft. Therefore, the electric motor can directly output power to drive the wheel shaft of the electric vehicle or drive the wheel shaft after speed reduction.

In the abovementioned electrical power system, the driving method, which is that the electric motor directly drives the wheel shaft through the transmission mechanism or drives the wheel shaft through the reduction mechanism with one-time speed reduction, is prone to lack of torque when the electric motor outputs torsional power to a vehicle wheel mounted at an end of the wheel shaft. Especially, an all-terrain electric vehicle needs to have a high-torque driving performance in response to different terrains. Outputting torque by the abovementioned directly-driving or driving-after-one-time-speed-reduction mechanisms, the all-terrain electric vehicle has difficulty driving on an uphill road with a higher slope. So, on the base of outputting power by a conventional electric motor, how to improve torque performance of the electrical power system is an important topic that the electrical power system needs to figure out.

SUMMARY OF THE INVENTION

The objective of the present invention is to provide a composite reduction driving mechanism to resolve the drawback of lack of the torque performance occurring when a reduction driving mechanism transmits power between an electric motor and a wheel shaft.

The composite reduction driving mechanism in accordance with the present invention is configured to be applied to an electrical power system of an electric vehicle and to connect between a driving shaft of an electric motor of the electrical power system and a wheel shaft. The composite reduction driving mechanism comprises a reduction gear set and a transmission band set.

The reduction gear set comprises a first reduction gear pair and a second reduction gear pair. The first reduction gear pair is connected to the driving shaft of the electric motor. The second reduction gear pair is rotated with the first reduction gear pair and has a driven shaft.

The transmission band set is connected between the reduction gear set and the wheel shaft, and comprises a first transmission wheel, a second transmission wheel and an annular transmission band. The first transmission wheel is mounted at the driven shaft. The second transmission wheel is mounted at the wheel shaft. The annular transmission band is mounted around and connected between the first transmission wheel and the second transmission wheel.

The composite reduction driving mechanism is applied to the electrical power system of the electric vehicle and is connected between the electric motor of the power system and the wheel shaft. By the composite reduction driving mechanism combining the reduction gear set and the transmission band set, in which the reduction gear set is connected to the driving shaft of the electric motor and the transmission band set connects between the driven shaft of the reduction gear set and the wheel shaft, power outputted by the electric motor is transmitted to the wheel shaft through the composite reduction driving mechanism and through two times of speed reduction during transmission, therefore providing a high-torque power performance to the wheel shaft.

The composite reduction driving mechanism further uses the reduction gear set that comprises the first reduction gear pair and the second reduction gear pair. By a step-by-step-incremental speed-reduction structure of the two reduction gear pairs of the reduction gear set, a stable and high-torque speed-reduction transmission performance is achieved. Furthermore, the composite reduction driving mechanism uses the transmission band set, which is connected between the driven shaft of the reduction gear set and the wheel shaft, to benefit a space utilization of the electrical power system in a vehicle body of the electric vehicle.

Further, the transmission band set of the composite reduction driving mechanism can be chosen to use a mechanism of sprocket-and-chain combination. Therefore, during a load changing of the electric vehicle, the transmission band set performs a damping effect between the reduction gear set, connected to the electric motor, and the wheel shaft, thus increasing the driving performance of the electrical power system.

DETAILED DESCRIPTION OF THE PREFERRED EMBODIMENT

Figure 1:
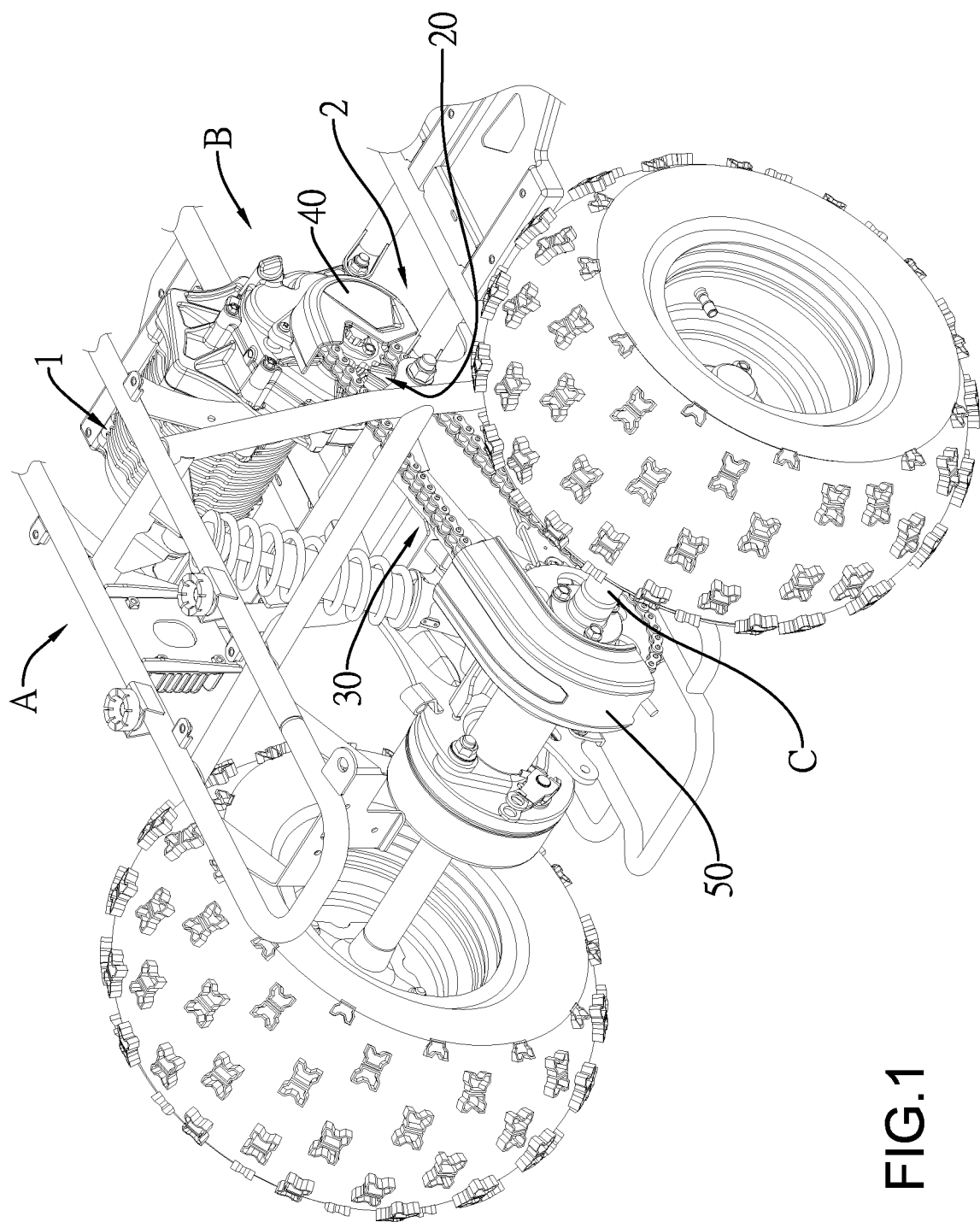
FIG. 1 is a partial perspective view of an embodiment of a composite reduction driving mechanism in accordance with the present invention, applied to an electric vehicle.

With reference to FIGS. 1 to 5, an implementation of an embodiment of a composite reduction driving mechanism 2 in accordance with the present invention, applied to an electric vehicle, is shown. The composite reduction driving mechanism 2 is applied to an electrical power system B of the electric vehicle and is mounted in a vehicle body A of the electric vehicle. The composite reduction driving mechanism 2 is connected between a driving shaft 10 of an electric motor 1 of the electrical power system B and a wheel shaft C of the electric vehicle and is used to transmit power outputted by the electric motor 1 to the wheel shaft C.

With reference to FIGS. 1 to 5, the composite reduction driving mechanism 2 comprises a reduction gear set 20 and a transmission band set 30, and uses the reduction gear set 20 to connect the driving shaft 10 of the electric motor 1. The transmission band set 30 connects both of the reduction gear set 20 and the wheel shaft C.

With reference to FIGS. 4 to 7, the reduction gear set 20 comprises a first reduction gear pair 21 and a second reduction gear pair 22. The first reduction gear pair 21 is connected to the driving shaft 10 of the electric motor 1. The second reduction gear pair 22 is rotated with the first reduction gear pair 21. The second reduction gear pair 22 has a driven shaft 222 and uses the driven shaft 222 to connect to and drive the transmission band set 30.

With reference to FIGS. 4 to 7, in the embodiment, the first reduction gear pair 21 comprises a driving gear 211, a middle shaft 212 and a first middle gear 213. The driving gear 211 is assembled on the driving shaft 10 of the electric motor 1. The middle shaft 212 is mounted in the vehicle body A and is parallel to and adjacent to the driving shaft 10. The first middle gear 213 is mounted at the middle shaft 212 and engages with the driving gear 211.

With reference to FIGS. 4 to 7, the second reduction gear pair 22 comprises the driven shaft 222 and further comprises a second middle gear 221 and a terminal gear 223. The second middle gear 221 is mounted at the middle shaft 212 and is coaxially rotated with the first middle gear 213. The driven shaft 222 is mounted in the vehicle body A and is parallel to and adjacent to the middle shaft 212. The terminal gear 223 is mounted at the driven shaft 222 and engages with the second middle gear 221.

With reference to FIGS. 4 to 7, a ratio of number of teeth of the driving gear 211 to the first middle gear 213 of the first reduction gear pair 21 and a ratio of number of teeth of the terminal gear 223 to the second middle gear 221 of the second reduction gear pair 22 are set based on actual driving performance requirements. In the embodiment, a number of teeth of the first middle gear 213 is larger than a number of teeth of the driving gear 211. A number of teeth of the second middle gear 221 is smaller than the number of teeth of the first middle gear 213. A number of teeth of the terminal gear 223 is larger than the number of teeth of the second middle gear 221. By a step-by-step-incremental speed-reduction structure of the two reduction gear pairs of the reduction gear set 20, a stable and high-torque speed-reduction transmission performance is achieved.

With reference to FIGS. 1 to 5, the transmission band set 30 is mounted in the vehicle body A and is connected between the driven shaft 222 of the second reduction gear pair 22 of the reduction gear set 20 and the wheel shaft C. The transmission band set 30 comprises a first transmission wheel 31, a second transmission wheel 32 and an annular transmission band 33. The first transmission wheel 31 is mounted at the driven shaft 222 and is coaxially rotated with the terminal gear 223. The second transmission wheel 32 is mounted at the wheel shaft C. The annular transmission band 33 is mounted around both of the first transmission wheel 31 and the second transmission wheel 32 and is connected between the first transmission wheel 31 and the second transmission wheel 32. A diameter of the first transmission wheel 31 is smaller than a diameter of the second transmission wheel 32, so that the first transmission wheel 31 and the second transmission wheel 32 provide a speed-reduction performance between the driven shaft 222 and the wheel shaft C. The transmission band set 30 can be a chain-type or a belt-type. When the transmission band set 30 is the chain-type, the first transmission wheel 31 and the second transmission wheel 32 are sprockets and the annular transmission band 33 is an annular chain. When the transmission band set 30 is the belt-type, the first transmission wheel 31 and the second transmission wheel 32 are belt pulleys and the annular transmission band 33 is an annular belt. The embodiment shows that the transmission band set 30 is the chain-type, but it is not for limitation. A type of the transmission band set 30 is chosen based on actual driving performance requirements.

Figure 2:
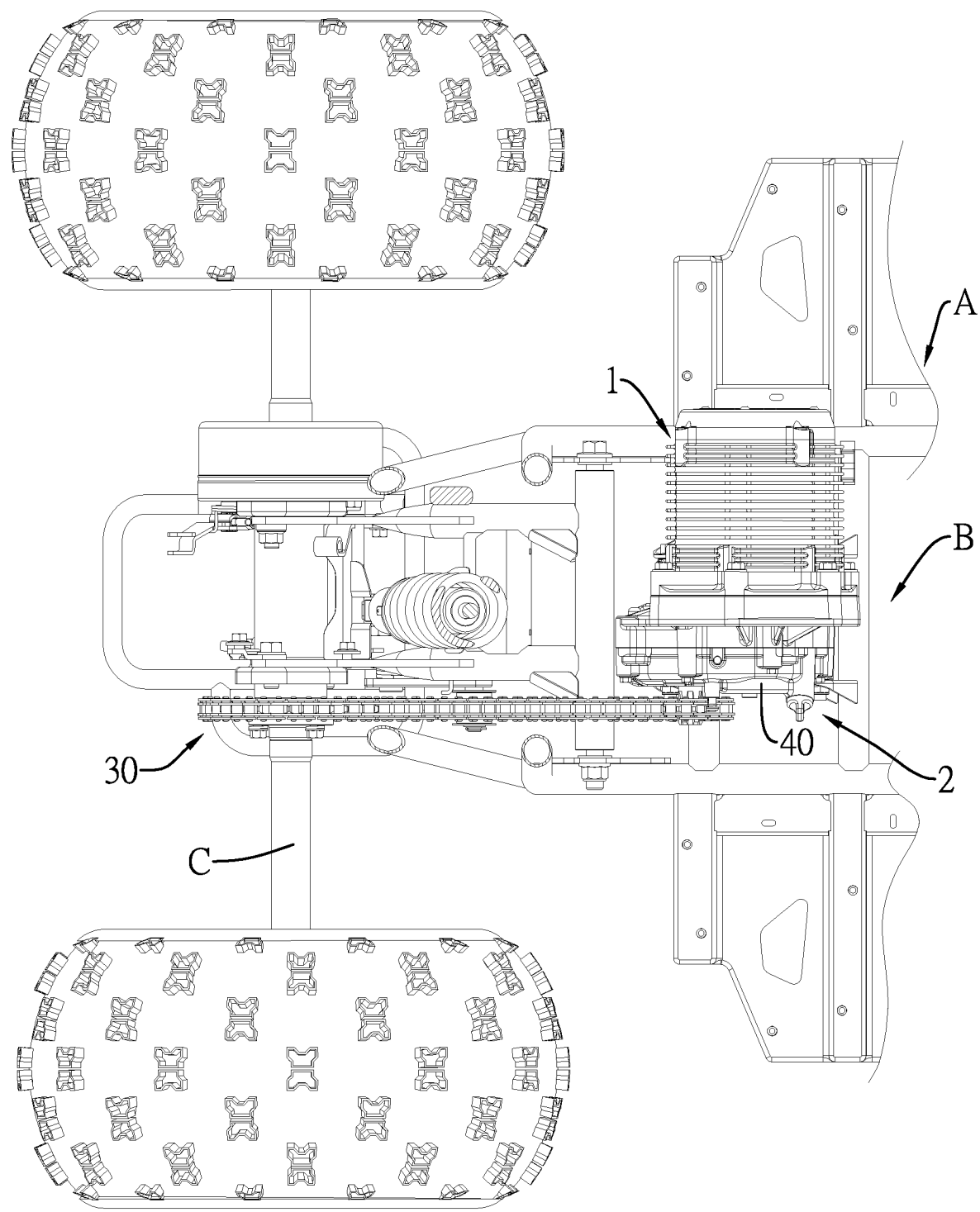
FIG. 2 is a partial top view of the embodiment, shown in FIG. 1, of the composite reduction driving mechanism, applied to the electric vehicle.
Figure 3:
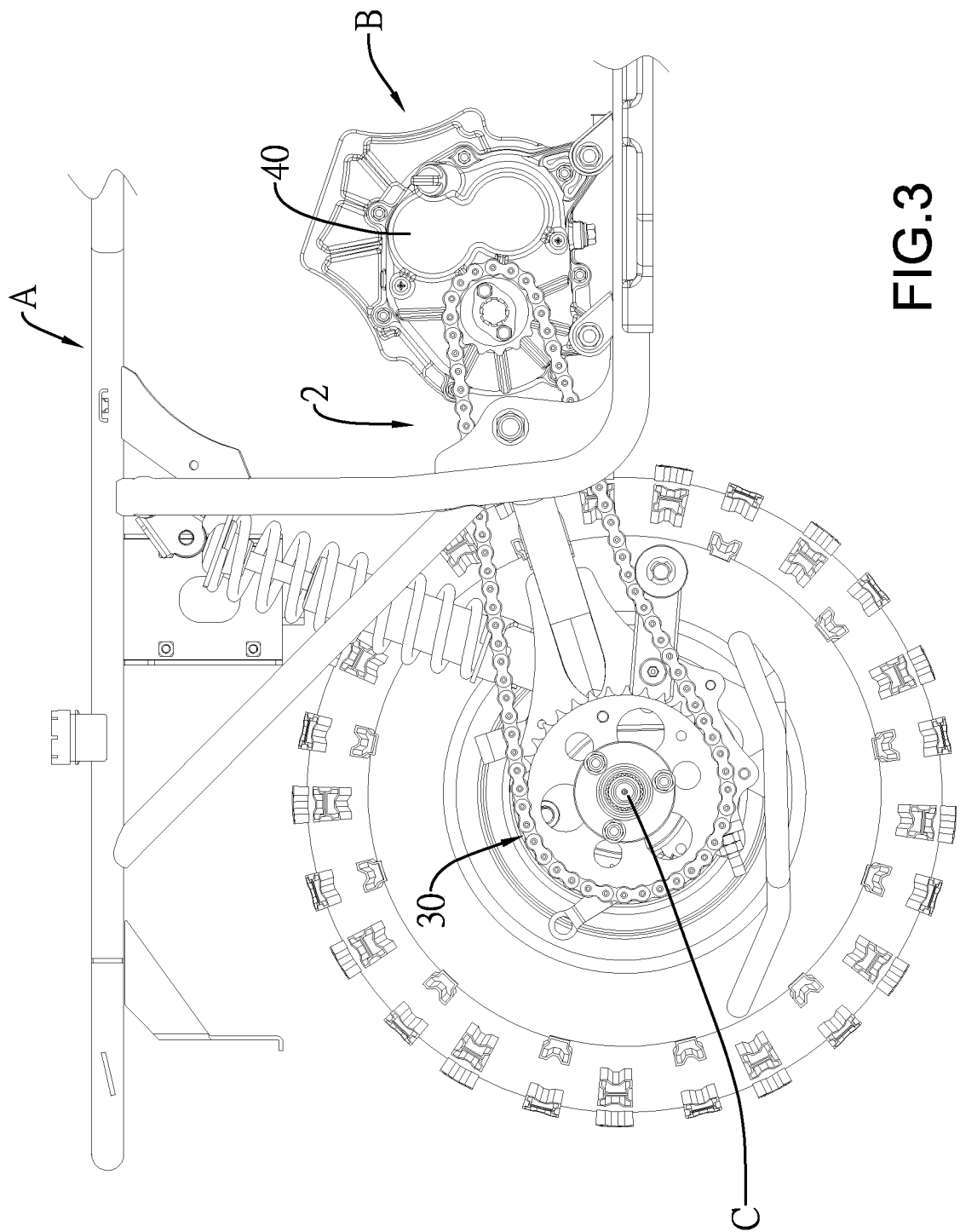
FIG. 3 is a partial side view of the embodiment, shown in FIG. 1, of the composite reduction driving mechanism, applied to the electric vehicle.
Figure 4:
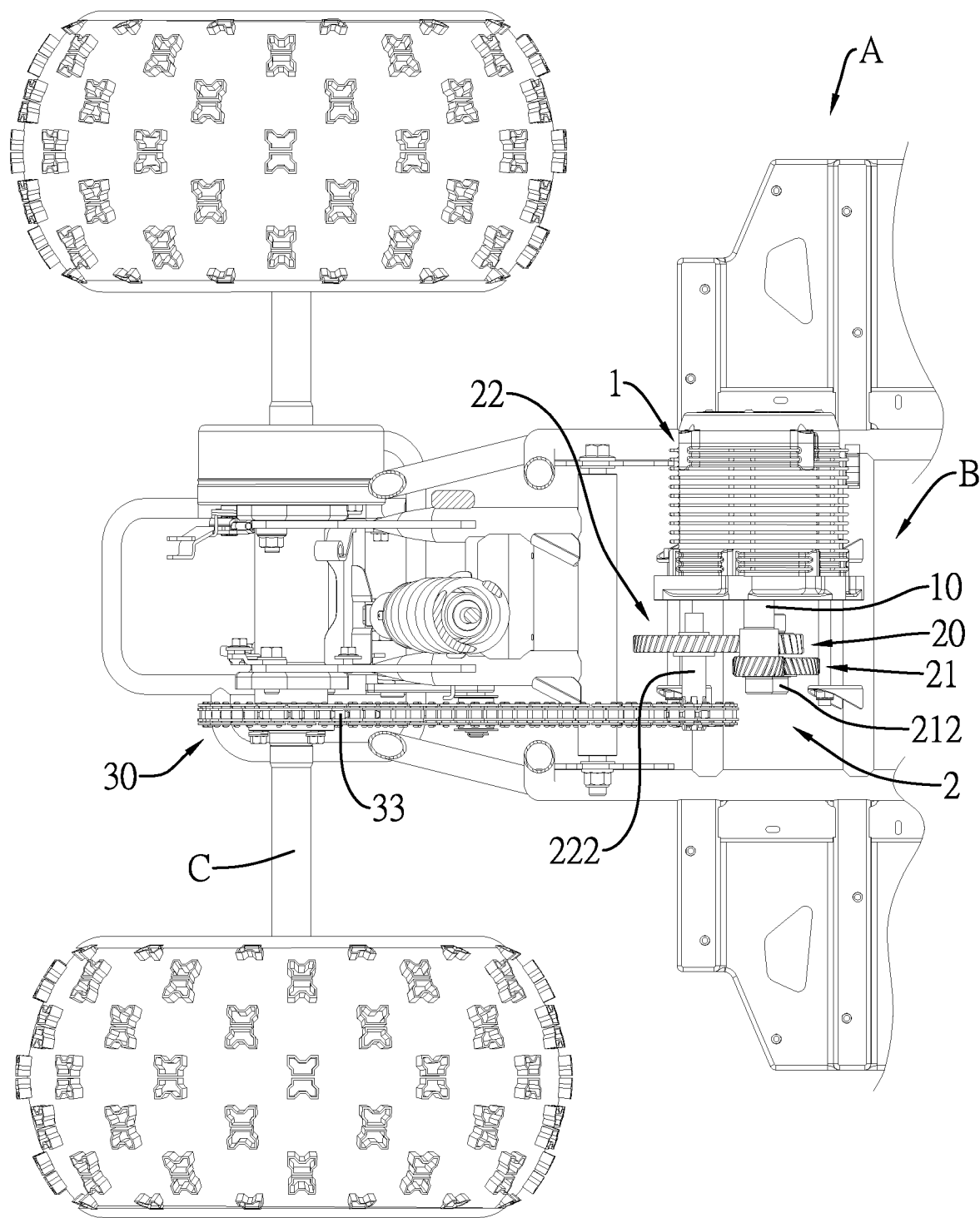
FIG. 4 is a partial top view of the embodiment, shown in FIG. 2, of the composite reduction driving mechanism, applied to the electric vehicle and with a first cover and a second cover removed.
Figure 5:
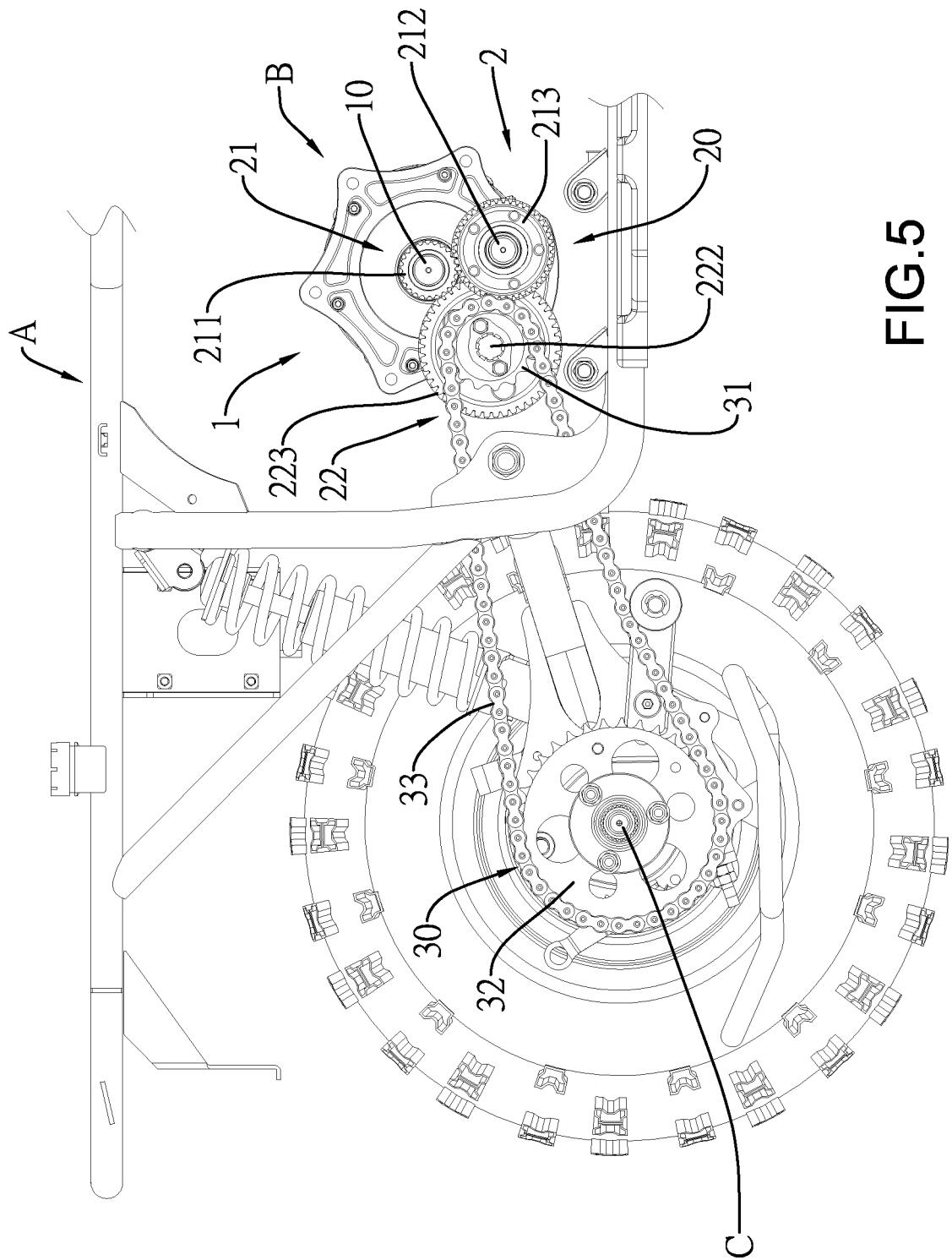
FIG. 5 is a partial side view of the embodiment, shown in FIG. 3, of the composite reduction driving mechanism, applied to the electric vehicle and with the first cover and the second cover removed.
Figure 6:
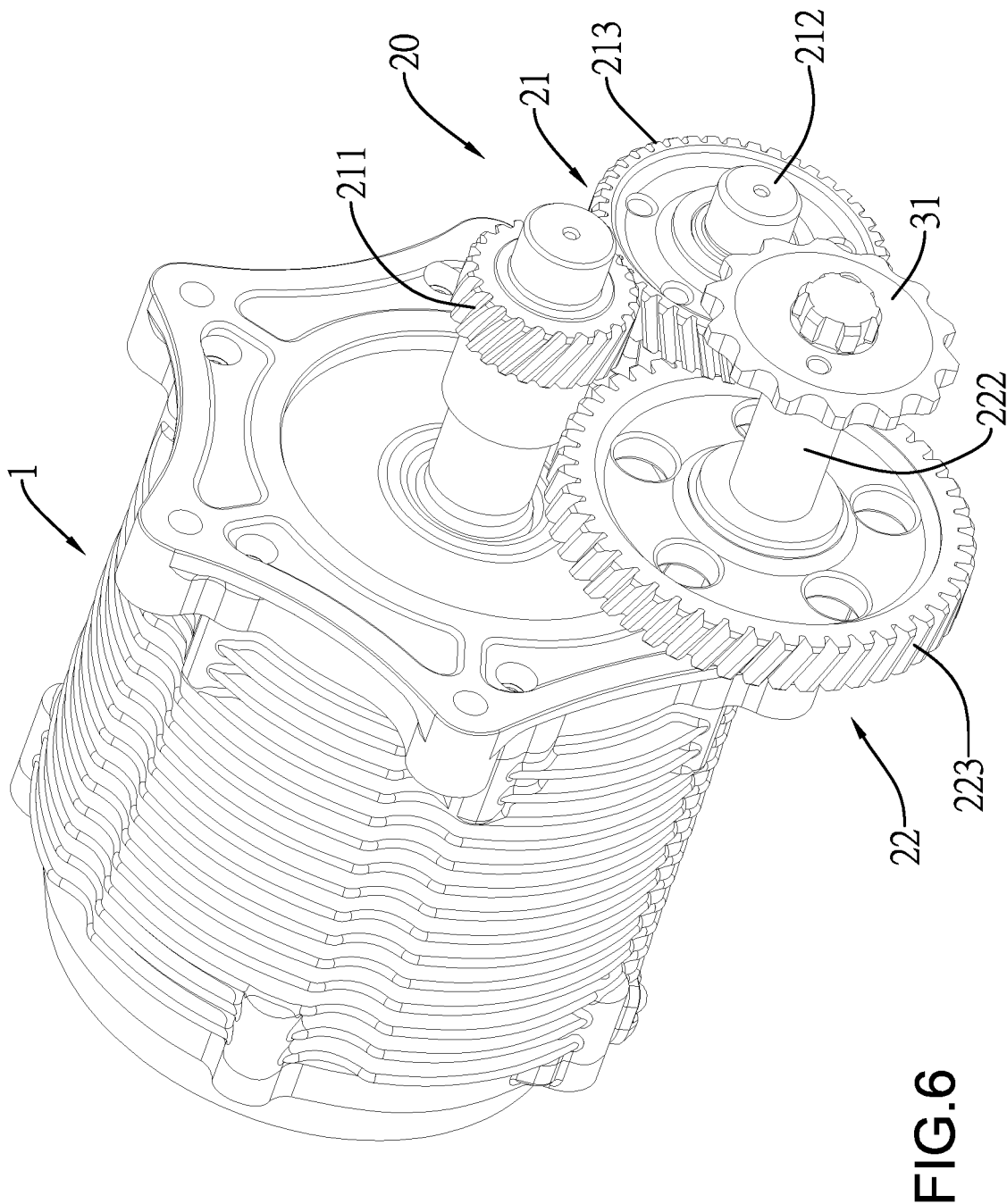
FIG. 6 is a perspective view of a reduction gear set of the embodiment, shown in FIGS. 1 to 5, of the composite reduction driving mechanism, connected to an electric motor.
Figure 7:
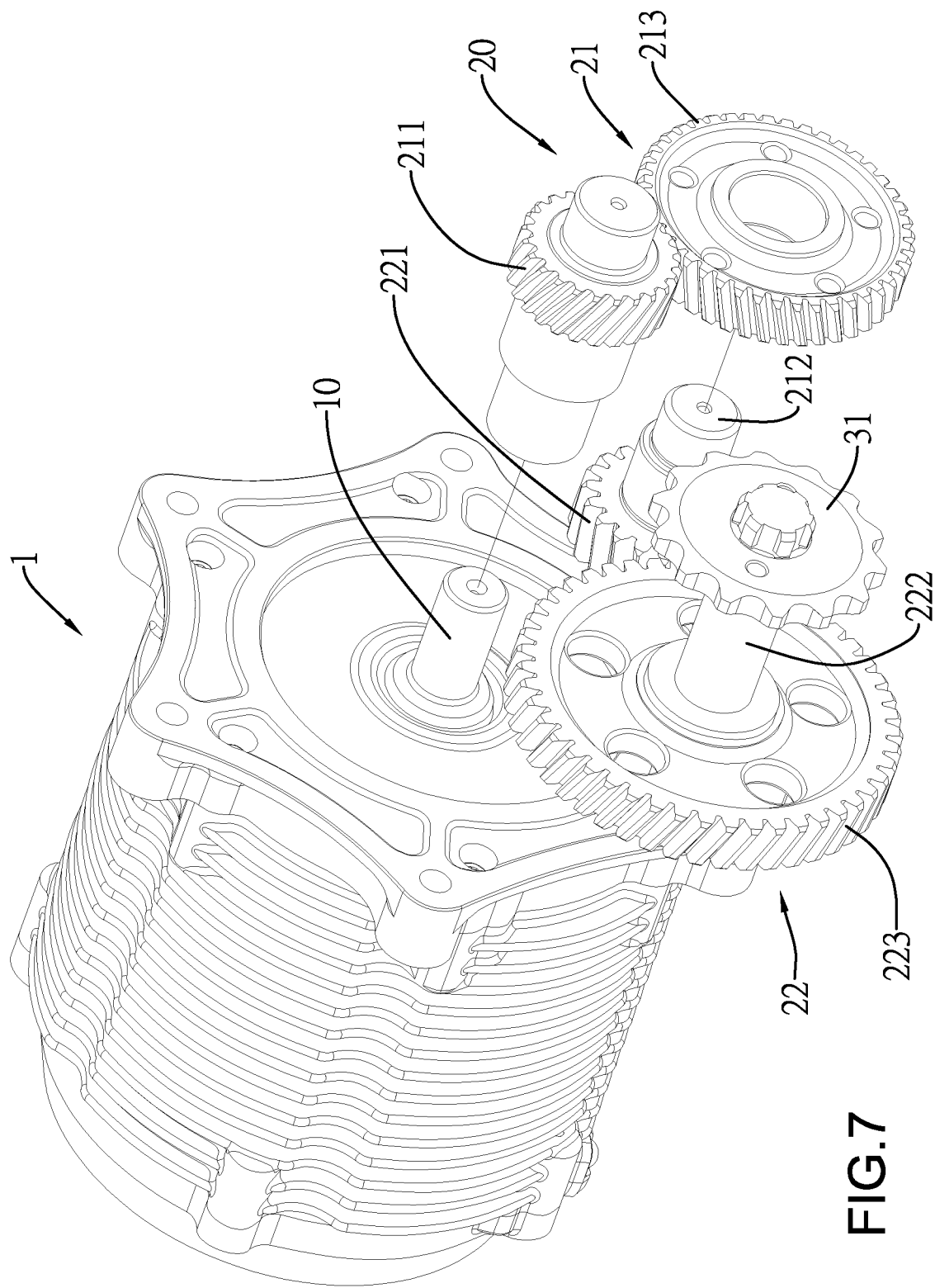
FIG. 7 is a partially-exploded perspective view of FIG. 6.

With reference to FIGS. 1 to 3, the composite reduction driving mechanism 2 further comprises a first cover 40 and a second cover 50. The first cover 40 is mounted at an outer side of the reduction gear set 20 to protect the reduction gear set 20, preventing any foreign body from entering the reduction gear set 20 and affecting the reduction gear set 20's transmission performance. In addition, the first cover 40 can be mounted on the electric motor 1. The second cover 50 is mounted at an outer side of the second transmission wheel 32, which is mounted at the wheel shaft C and is surrounded by the annular transmission band 33, of the transmission band set 30 and protects the transmission band set 30. In addition, the second cover 50 can be mounted in the vehicle body A.

The composite reduction driving mechanism 2 is applied to the electrical power system B of the electric vehicle. The composite reduction driving mechanism 2 is a composite structure of the reduction gear set 20 and the transmission band set 30 combined with each other, uses the reduction gear set 20 to connect the driving shaft 10 of the electric motor 1, and uses the transmission band set 30 to connect the driven shaft 222 of the reduction gear set 20 and the wheel shaft C. Therefore, the power outputted by the electric motor 1 is transmitted to the wheel shaft C through the composite reduction driving mechanism 2 and through two times of speed reduction during transmission, providing a high-torque power performance to the wheel shaft C. Besides, if the transmission band set 30 is chosen from a mechanism of sprocket-and-chain combination, during a load changing of the electric vehicle, the transmission band set 30 performs a damping effect between the reduction gear set 20, connected to the electric motor 1, and the wheel shaft C, thus increasing the driving performance of the electrical power system B.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the board general meaning of the terms in which the appended claims are expressed.

What is claimed is:

1. A composite reduction driving mechanism configured to be applied to an electrical power system of an electric vehicle and to connect between a driving shaft of an electric motor of the electrical power system and a wheel shaft, the composite reduction driving mechanism comprising:
   a reduction gear set comprising
      a first reduction gear pair connected to the driving shaft of the electric motor; and a second reduction gear pair rotated with the first reduction gear pair and having
a driven shaft;
a transmission band set connected between the reduction gear set and the wheel shaft, and comprising
a first transmission wheel mounted at the driven shaft;
a second transmission wheel mounted at the wheel shaft; and
an annular transmission band mounted around both of the first transmission wheel and the second transmission wheel and connected between the first transmission wheel and the second transmission wheel, wherein the first reduction gear pair comprises;
a driving gear assembled on the driving shaft of the electric motor;
a middle shaft mounted in a vehicle body of the electric vehicle, and parallel to and adjacent to the driving shaft; the driving shaft disposed between the middle shaft and the driven shaft; and
a first middle gear mounted at the middle shaft and engaging with the driving gear;
the driving gear and the first middle gear are located at a first plane;
the second reduction gear pair further comprising
a second middle gear mounted at the middle shaft and coaxially rotated with the first middle gear; the driven shaft mounted in the vehicle body and parallel to and adjacent to the middle shaft;
a terminal gear mounted at the driven shaft and engaging with the second middle gear;
the second middle gear and the terminal gear are located at a second plane disposed between the electric motor and the first plane;
the first transmission wheel and the second transmission wheel both are sprockets and the annular transmission band is an annular chain.

2. The composite reduction driving mechanism as claimed in claim 1, wherein a number of teeth of the first middle gear is larger than a number of teeth of the driving gear; a number of teeth of the second middle gear is smaller than the number of teeth of the first middle gear; a number of teeth of the terminal gear is larger than the number of teeth of the second middle gear.

3. The composite reduction driving mechanism as claimed in claim 1, wherein a first cover is mounted at an outer side of the reduction gear set.

4. The composite reduction driving mechanism as claimed in claim 3, wherein a first cover is mounted at an outer side of the reduction gear set.

5. The composite reduction driving mechanism as claimed in claim 1, wherein a second cover is mounted at an outer side of the second transmission wheel which is surrounded by the annular transmission band.

6. The composite reduction driving mechanism as claimed in claim 3, wherein a second cover is mounted at an outer side of the second transmission wheel which is surrounded by the annular transmission band.

7. The composite reduction driving mechanism as claimed in claim 4, wherein a second cover is mounted at an outer side of the second transmission wheel which is surrounded by the annular transmission band.

* * * * *